US012122062B2

(12) United States Patent
Liu et al.

(10) Patent No.: US 12,122,062 B2
(45) Date of Patent: Oct. 22, 2024

(54) CENTRING BLOCK FOR CENTRING A TOOLING BOARD IN A FLAT BED DIE-CUTTING, STRIPPING OR BLANKING MACHINE AND CENTRING ASSEMBLY

(71) Applicant: BOBST MEX SA, Mex (CH)

(72) Inventors: Shelly Liu, Shanghai (CN); Bernard Jaquet, Rue (CH)

(73) Assignee: BOBST MEX SA, Mex (CH)

( * ) Notice: Subject to any disclaimer, the term of this patent is extended or adjusted under 35 U.S.C. 154(b) by 193 days.

(21) Appl. No.: 17/759,753

(22) PCT Filed: Jan. 22, 2021

(86) PCT No.: PCT/EP2021/051502
§ 371 (c)(1),
(2) Date: Jul. 29, 2022

(87) PCT Pub. No.: WO2021/160408
PCT Pub. Date: Aug. 19, 2021

(65) Prior Publication Data

US 2023/0056645 A1 Feb. 23, 2023

(30) Foreign Application Priority Data

Feb. 13, 2020 (EP) .................................... 20020067

(51) Int. Cl.
*B26F 1/44* (2006.01)

(52) U.S. Cl.
CPC ........ *B26F 1/44* (2013.01); *B26F 2001/4409* (2013.01)

(58) Field of Classification Search
CPC ...... B26F 1/38; B26F 1/44; B26F 2001/4463; B26F 2001/4409; B26D 2007/189
(Continued)

(56) References Cited

U.S. PATENT DOCUMENTS 4,598,574 A * 7/1986 Hegel .................... B21D 37/14 72/481.6
4,664,366 A 5/1987 Lane et al.
(Continued)

FOREIGN PATENT DOCUMENTS

CA 2287035 A1 4/2001
CN 102528853 A 7/2012
(Continued)

OTHER PUBLICATIONS

European Patent Office, International Search Report, PCT/EP2021/051502, Apr. 19, 2021, 3 pages, Europe.

*Primary Examiner* — Nhat Chieu Q Do
(74) *Attorney, Agent, or Firm* — Bookoff McAndrews, PLLC

(57) ABSTRACT

A centring block (12) for centring a tooling board (14) in a flat bed die-cutting, stripping or blanking machine is provided, the tooling board (14) having a protruding alignment element (30), comprising a first clamp (24) and a second clamp (26) which are arranged adjacent to each other to define a reception space (28) between them and which are mounted linearly moveable separately from each other in a direction perpendicular to a main extension plane of the tooling board (14) and at least one biasing means (34) which is configured to bias the first and the second clamps (24, 26) towards an aligning position against the tooling board (14), wherein each of the clamps (24, 26) comprises a stop portion (31) for restricting a movement of the tooling board (14) in an insertion and an opposite direction and to fix the tooling board (14) is in a centre position. Furthermore, a centring assembly (10) comprising a centring block (12) is provided.

12 Claims, 4 Drawing Sheets

Figure 1:
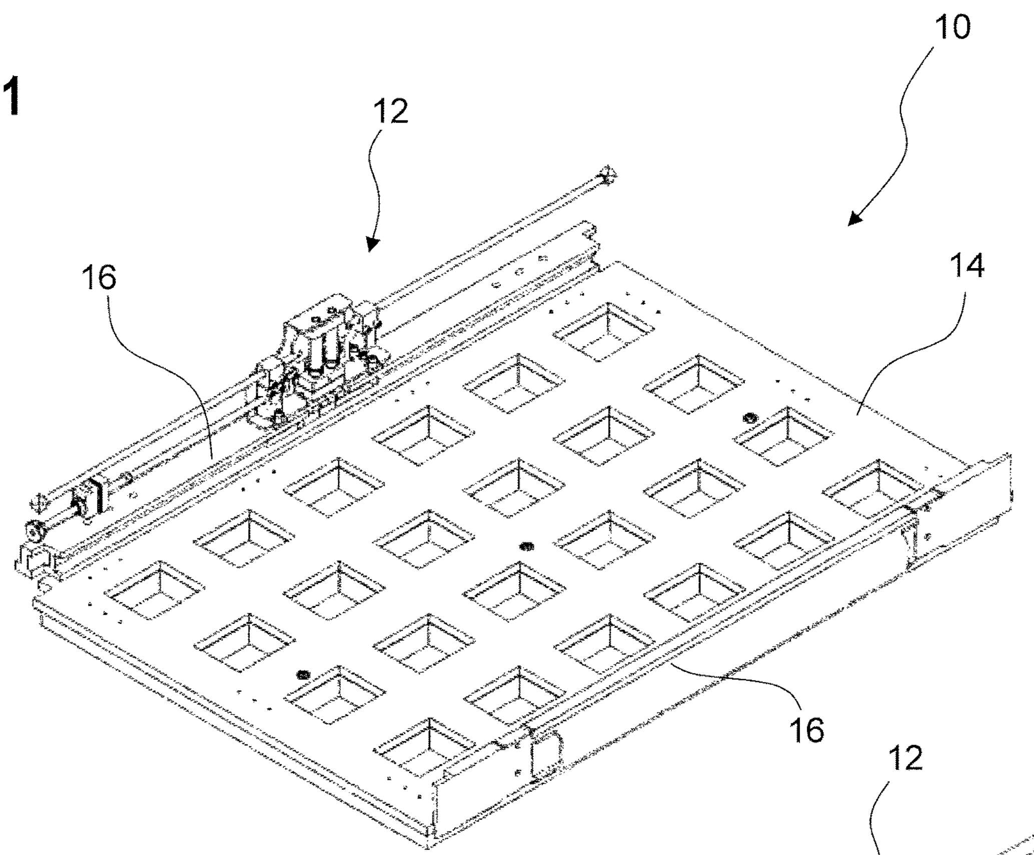

(58) Field of Classification Search
USPC .............................................................. 83/652
See application file for complete search history.

(56) References Cited

U.S. PATENT DOCUMENTS

| | | | | |
|---|---|---|---|---|
| 6,116,126 | A | 9/2000 | Van Den Bulcke et al. | |
| 6,138,546 | A | 10/2000 | Hursey | |
| 6,851,243 | B1 | 2/2005 | Sandford | |
| 7,290,761 | B2 * | 11/2007 | Siegel ........................ | B25B 1/08 269/266 |

FOREIGN PATENT DOCUMENTS

| | | | |
|---|---|---|---|
| CN | 104550536 | B | 4/2015 |
| CN | 205086077 | U | 3/2016 |
| CN | 207521585 | U | 6/2018 |
| CN | 108290228 | A | 7/2018 |
| CN | 207577252 | U | 7/2018 |
| EP | 1394090 | A2 | 3/2004 |

* cited by examiner

CENTRING BLOCK FOR CENTRING A TOOLING BOARD IN A FLAT BED DIE-CUTTING, STRIPPING OR BLANKING MACHINE AND CENTRING ASSEMBLY

CROSS-REFERENCE TO RELATED APPLICATION(S)

This patent application is a National Stage Application under 35 U.S.C. § 371 of International Patent Application No. PCT/EP2021/051502, filed on Jan. 22, 2021, which claims priority to European Application No. 20020067.3, filed on Feb. 13, 2020, the entireties of which are incorporated herein by reference.

The invention relates to a centring block for centring a tooling board in a flat bed die-cutting, stripping or blanking machine and a centring assembly for a flat bed die-cutting, stripping or blanking machine comprising a centring block.

Flat bed die-cutting machines, flat bed stripping machines or part separation machines may be part of a production line in which paper, cardboard, corrugated board or plastic are processed, for example for packaging. For example, a plurality of blanks on the same sheet are die-cut and subsequently separated in a flat bed die-cutting machine with an adjoining flat bed stripping device.

In order to enable the processing of different packaging, an exchangeable tooling board which is specific for a kind of packaging to be processed is mounted in the respective machine. For flat bed die-cutting machines, for example, these tooling boards are pressure plates which have cutting knives or pressure pads attached thereto. The tooling boards are usually inserted into the machine from the side with respect to the transport direction of the workpiece.

It is essential that the machines work with very high precision. The exchangeable tooling board must be exactly adapted to the pressure applied and aligned with the edges of cut in the preceding station. If upper and lower exchange tools are provided, as it is the case in the die-cutting or stripping machines, these tools further need to be precisely aligned with each other.

For aligning the tooling board in a centre position, flat bed die-cutting, stripping or blanking machines usually comprise centre blocks which can restrict a movement of the tooling board upon insertion of the tooling board in the machine respectively inhibit a movement of the tooling board after the tooling board has been inserted.

The known centring blocks comprise swivel mounted clamps which can encompass an alignment element of the tooling board. However, such centring blocks are complicated to assemble and expensive and are dedicated to high level machines.

Therefore, it is an object of the invention to provide a centring block which is cost-effective and easy to assemble and are applicable for entry level machines.

This object is achieved by a centring block for centring a tooling board in a flat bed die-cutting, stripping or blanking machine, the tooling board having a protruding alignment element, comprising a first clamp and a second clamp which are arranged adjacent to each other to define a reception space between them and which are mounted linearly moveable separately from each other in a direction perpendicular to a main extension plane of the tooling board. The centring block further comprises at least one biasing means which is configured to bias the first and the second clamps towards an aligning position against the tooling board, wherein each of the clamps comprises a stop portion for restricting a movement of the tooling board in an insertion and an opposite direction and to fix the tooling board is in a centre position.

By means of the centring block, the tooling board can be precisely located in a defined position. When the tooling board is inserted in the machine, it will abut the stop portion when it has reached the centre position.

When the clamps are in the aligning position and the alignment element of the tooling board is in the reception space, the clamps are enabled to centre the tooling board in a desired centring position. In this condition, the alignment element of the tooling board is surrounded by the clamps such that a movement of the tooling board is restricted by means of the clamps.

The aligning position of the clamps is in particular a position in which the clamps are in their maximum extended position.

Due to the clamps being linearly moveable, the assembling of the centring block is simple and the positioning of the tooling board can be very precise. In particular, positioning tolerances of the tooling board are less than upon use of a centring block with swivel mounted clamps.

When the tooling board is inserted in the machine, the biasing means may bias the clamps against the tooling board.

According to one embodiment, at least one of the clamps, in particular both of the clamps, comprise a slanted surface facing away of the reception space and in a direction opposite to the insertion direction, wherein a clamp is moved against a biasing force of the biasing means when a force is applied on the slanted surface to lift the clamp. In particular, the slanted surface is inclined with respect to a movement direction of the clamps.

Due to the slanted surface, a clamp is lifted when the tooling board abuts the slanted surface during insertion of the tooling board in a machine. Therefore, inserting the tooling board in a machine may be very easy. In particular, no manually handling of the clamps is required for inserting the tooling board.

An extension of the slanted surface in the direction of movement of the respective clamp is preferably such that the alignment element of the tooling board abuts the slanted surface of the clamp. That means, that an extension of the slanted surface in the direction of movement of the respective clamp may be at least as large as a height of the alignment element measured from a surface of the tooling board facing towards the centring block. Then, the clamp can be lifted by means of the alignment element.

According to one embodiment, each of the clamps has an indentation wherein the indentations of the clamps together form the reception space for an alignment element of the tooling board. Thus, no additional element is required to form the reception space. Furthermore, the tooling board, in particular the alignment element, is automatically received in the reception space during insertion of the tooling board in a machine.

Each of the clamps may be fastened to a slidably moveable shaft and a bearing element may be provided at, e.g. fixed to each shaft, wherein the bearing element provides a contact surface for the biasing means.

The shaft may serve to guide the respective clamp in a linearly moveable manner, for example by means of the shaft being slidably received in a guidance hole.

Due to the bearing element providing a contact surface for the biasing means, the centring block may be very compact.

The bearing element may also serve to restrict a movement of the clamps in a direction towards the tooling board.

The biasing means may be a helical spring which is mounted concentrically around the shaft and rests on the bearing. Therefore, the structure of the centring block may be quite simple.

According to one embodiment, the centring block comprises an unlocking element which is moveable in a release direction against a biasing force of the biasing means, wherein the bearing elements rest on the unlocking element when the clamps are in the aligning position such that the clamps are lifted when the unlocking element is moved in the release direction. Thus, by moving the unlocking element in the release direction, the tooling board, not precisely the alignment element is released from the reception space and may be removed from the machine.

For moving the unlocking element from a position outside of the machine, the centring block may comprise a handle which is in operative connection with the unlocking element such that the unlocking element is moved in the release direction when the handle is actuated. In particular, the handle may be actuated by a user.

By means of the handle, a user may operate the unlocking element with one hand. With the other hand, he can pull the tooling board out of the machine at least a little bit such that the alignment element is moved out of the engagement with the centring block. Then, the tooling board can be moved out of the machine without actuating the handle. Therefore, one person alone is enabled to exchange the tooling board.

Preferably the handle and the unlocking element are connected such that a movement of the handle in a direction parallel to a main extension plane of the tooling board results in a movement of the unlocking element perpendicular to the main extension plane of the tooling board. Thereby, the handle may be actuated in an ergonomic way. In particular, a user may pull or push the handle in order to release the tooling board.

According to one embodiment, the unlocking element or the handle comprises a guiding slot which extends inclined to a movement direction of the unlocking element, the other one of the unlocking element and the handle comprising a pin which runs in the guiding slot such that upon actuation of the handle the unlocking element is forced to move in the release direction. By this means, the unlocking element and the handle may be in operative connection in a simple way.

The pin may be firmly fixed to the respective element.

In this context, a pin also means a screw or a bolt.

The centring block may further comprise a support element for fixing the centring block to an elongated rail of a flat bed die-cutting, stripping or blanking machine. On the support element, all elements of the centring block may be mounted. Therefore, the centring block may be preassembled, such that a mounting of the centring block in the machine may be easy and quick. In particular, the centring block may be obtained from a supplier in a preassembled form.

The support element for example comprises a sheet metal part. Additionally, the support element may comprise support blocks to increase the stability of the centring block and to improve the guiding of the clamps.

The object of the invention is further achieved by means of a centring assembly for a flat bed die-cutting, stripping or blanking machine, comprising a centring block as previously described, a tooling board comprising an alignment element, wherein the centring block is configured to centre the tooling board by centring the alignment element, and at least one elongated rail for slidably guiding the tooling board into and out of the a flat bed die-cutting, stripping or blanking machine.

Such an assembly has the advantage, that a tooling board may be slidably guided into its centre position in a very easy way. A user exchanging the tooling board does not need to actively centre the tooling board, but just needs to push the tooling board into the machine until it abuts the stop portion of one of the clamps.

Figure 2:
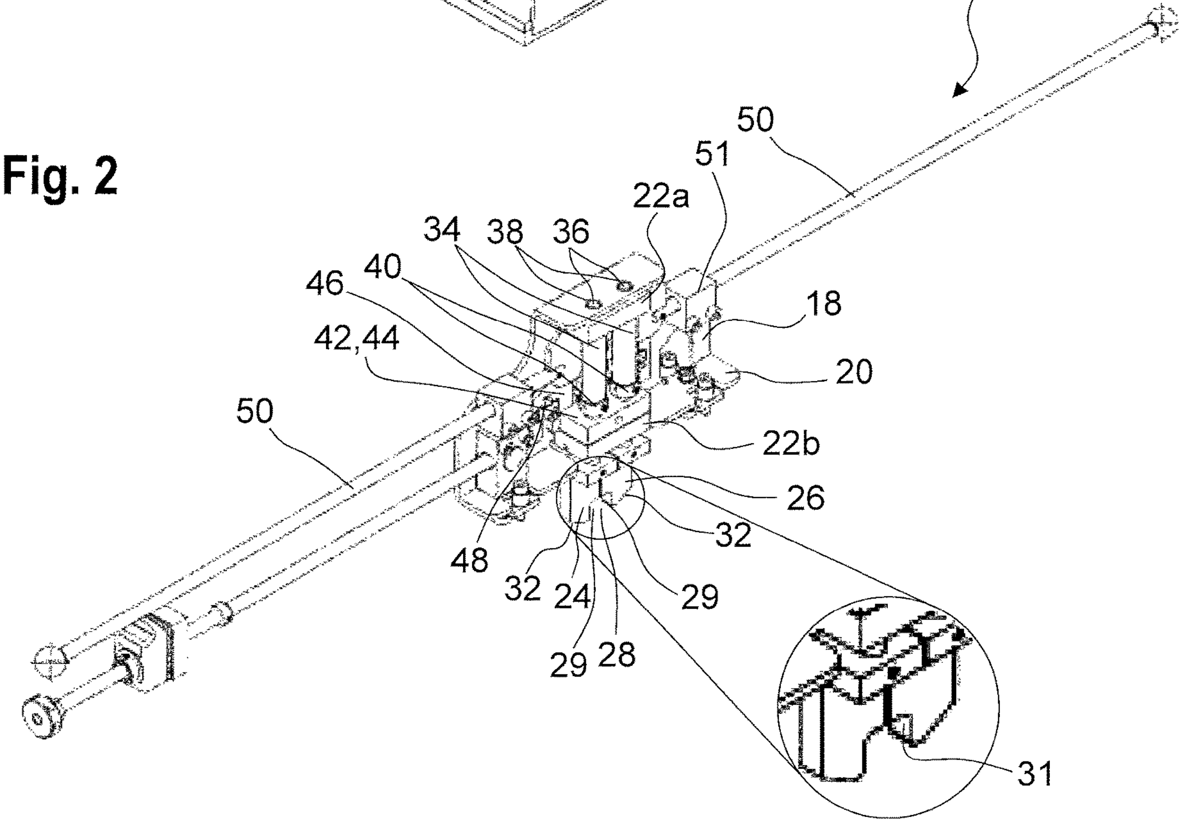
Figure 3:
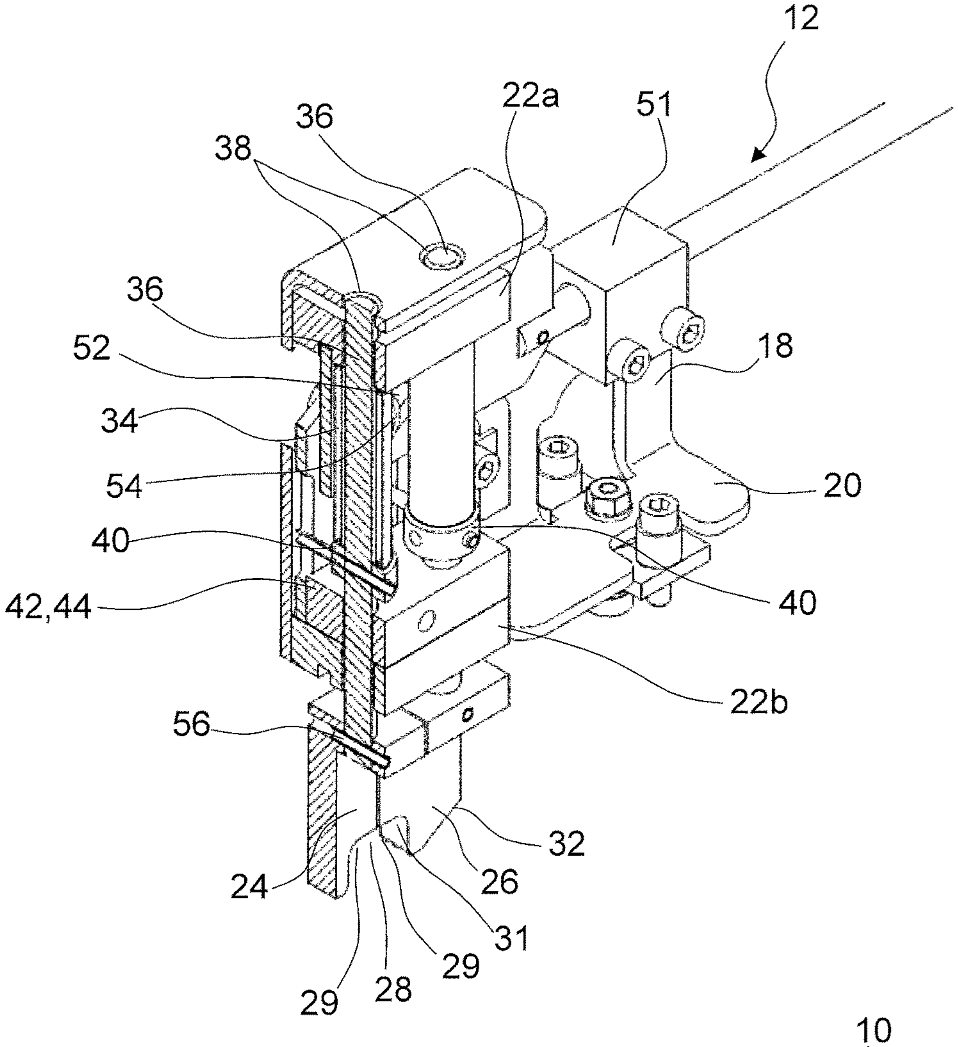
Figure 4:
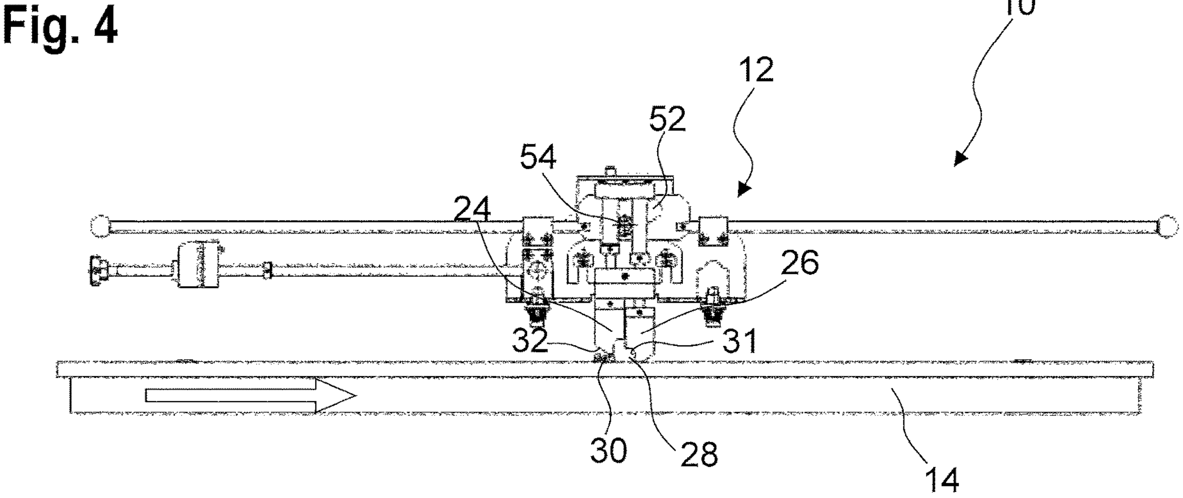
Figure 5:
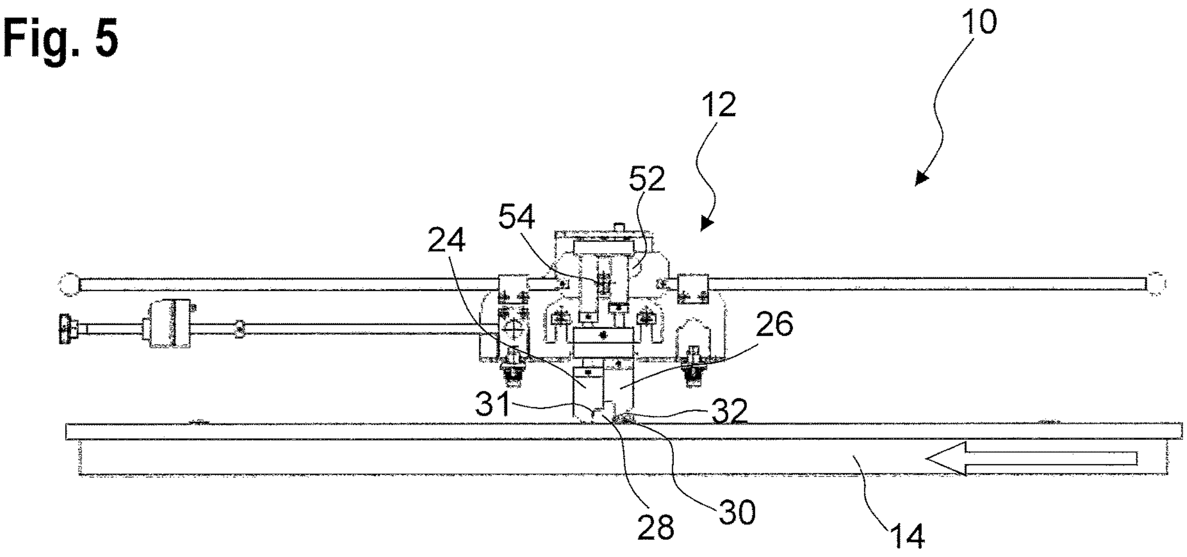
Figure 6:
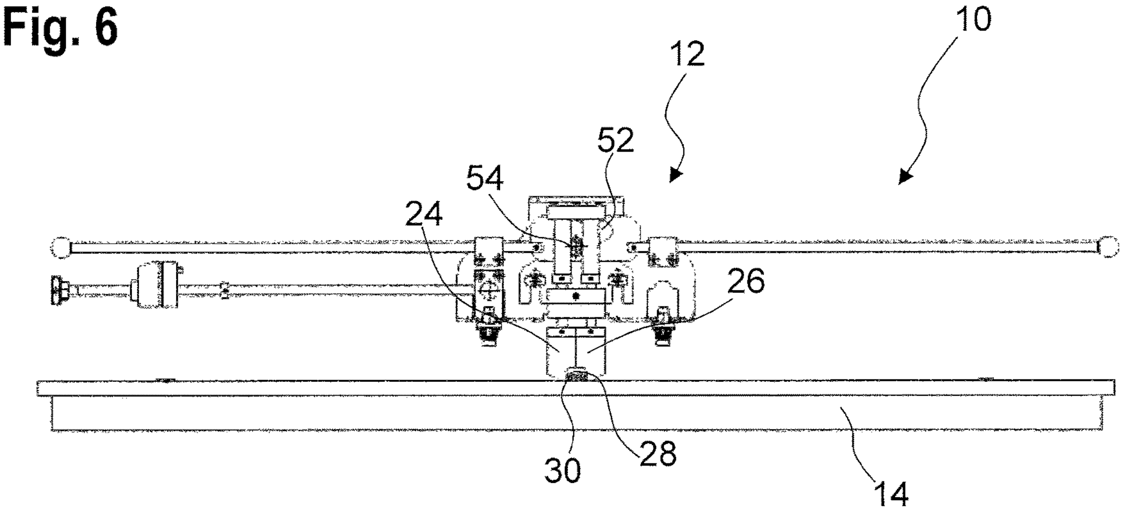
Figure 7:
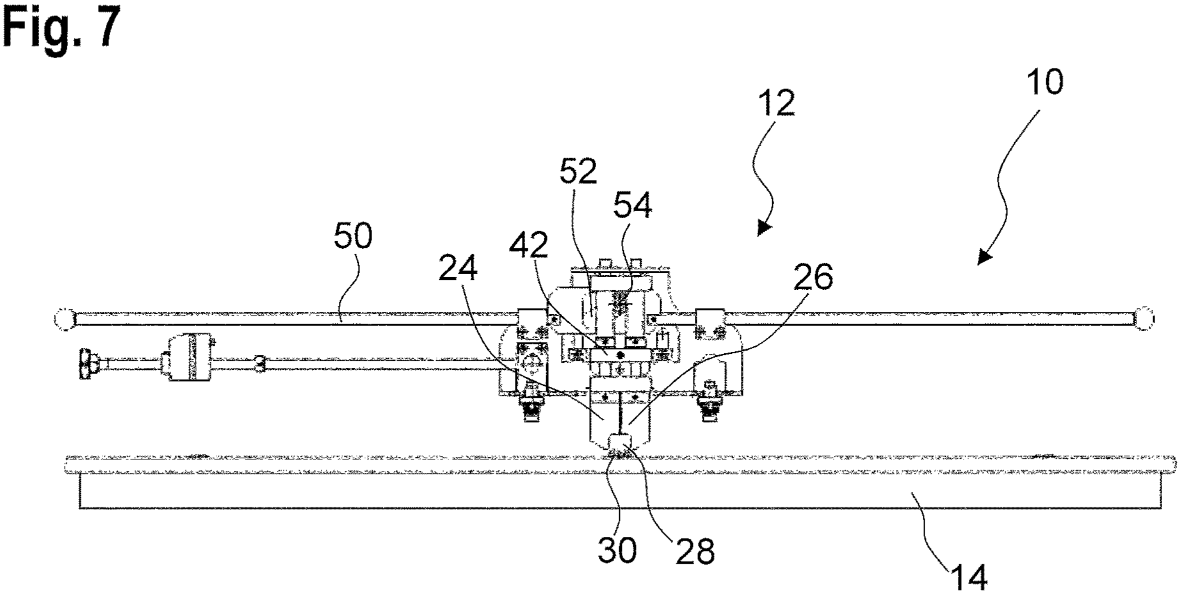

Further features and advantages of the invention can be derived from the following description and from the Figures. In the drawings:

FIG. 1 shows an inventive centring assembly with an inventive centring block, FIG. 2 shows a perspective view of an inventive centring block, FIG. 3 shows a sectional view of the centring block in FIG. 2, FIG. 4 shows the assembly of FIG. 1 during insertion of a tooling board, FIG. 5 shows the assembly of FIG. 1 during insertion of a tooling board in a direction opposite to that in FIG. 4, FIG. 6 shows a side view of the assembly of FIG. 1 with the tooling board being in the centre position, and FIG. 7 shows the assembly of FIG. 1 during an unlocking of the tooling board.

FIG. 1 shows a centring assembly 10 for a flat bed die-cutting, stripping or blanking machine.

The centring assembly 10 comprises a centring block 12, an exchangeable tooling board 14 and two elongated rails 16. The rails 16 are configured for slidably guiding the tooling board 14 from the side into and out of a flat bed die-cutting, stripping or blanking machine in an insertion and an opposite direction.

The tooling board 14 is for example a pressure plate.

In FIG. 1, the tooling board 14 is shown in a defined centre position. When the tooling board 14 is in its centre position, a precise processing of paper, cardboard, corrugated board or plastic in a flat bed die-cutting, stripping or blanking machine may be possible. In particular, the process accuracy may be very high.

In order to precisely position the tooling board 14, the centring block 12 is provided which is described in detail with reference to FIGS. 2 and 3.

FIG. 2 shows a perspective view of the centring block 12.

For fixing the centring block 12 to an elongated rail 16, the centring block 12 comprises a support element 18. On the support element 18, all elements of the centring block 12, which will be described in the following, may be mounted.

In the shown embodiment, the support element 18 comprises a sheet metal part 20 and two support blocks 22, in particular an upper support block 22*a* and a lower support block 22*b*. The support blocks 22 are for example plastic blocks or metal blocks. The sheet metal part 20 is for example a bent part which, when viewed from the side, has a C-form.

The centring block 12 further comprises a first clamp 24 and a second clamp 26. The clamps 24, 26 are arranged adjacent to each other to define a reception space 28 between them. The reception space 28 is configured to receive an alignment element 30 which is attached to the tooling board 14 (see for example FIG. 4). Thereby, the tooling board 14 may be fixed in the centre position, as shown in FIG. 1.

In order to receive the alignment element 30 of the tooling board 14, the clamps 24, 26 are mounted linearly movable and separately movable from each other in a direction perpendicular to a main extension plane of the tooling board 14. Thus, the clamps 24, 26 may be lifted in order to receive the alignment element 30 of the tooling board 14 in the reception space 28.

Both clamps 24, 26 comprise a slanted surface 32 facing away of the reception space 28 and in a direction opposite to the insertion direction. When a force is applied on the slanted surface 32 of a clamp 24, 26, for example by the tooling board 14, in particular the alignment element 30, the clamp 24, 26 is lifted. Thereby, the alignment element 30 may move into the reception space 28. Thus, the slanted surface 32 is arranged at the lower, outer edge of the respective clamp 24, 26.

To form the reception space 28, each of the clamps 24, 26 has an indentation 29. The indentations 29 of the clamps 24, 26 together form the reception space 28, in particular when the clamps 24, 26 are in the alignment position.

For accurately centring the tooling board 14, each of the clamps 24, 26 comprises a stop portion 31.

As soon as the alignment element 30 abuts a stop portion 31 of one of the clamps 24, 26, a further movement of the tooling board 14 in the insertion direction is inhibited.

A width of the reception space 28 extending in the insertion direction preferably corresponds to a width of the alignment element 30. Thereby, a movement of the tooling board 14 may be reliably inhibited.

To ensure that the clamps 24, 26 return into an alignment position after having been lifted, the centring block 12 comprises biasing means 34 which are configured to bias the clamps 24, 26 towards the aligning position, in particular against the tooling board 14. The biasing means 34 are for example springs, in particular helical springs.

When the clamps 24, 26 are lifted, they have to be moved against the biasing force of the biasing means 34.

In order to mount the clamps 24, 26, each clamp 24, 26 is fastened to a slidably moveable shaft 36.

The shafts 36 are respectively received in bores 38 in the support blocks 22, in particular linearly moveable and slideably guided in the bores 38.

A bearing element 40 is fixed to each shaft 36, wherein the bearing element 40 provides a contact surface for the biasing means 34. Another contact surface for the biasing means 34 is provided at the upper support block 22*a*. Thus, the biasing means 34 is retained between the bearing element 40 and the upper support block 22*a*.

Furthermore, the bearing element 40 provides a stop for the respective clamp 24, 26 such that the clamps 24, 26 may rest in the alignment position.

Of course, it is also possible that separate bearing elements 40 for providing a stop and for providing a contact surface for the biasing means 34 are provided on each shaft 36. However, by providing only one bearing element 40 on each shaft, the centring block 12 may have a compact and space saving design.

In the shown embodiment, the bearing elements 40 have a ring shape, wherein the rings surround the shafts 36 and are fixed to the shafts 36 by means of screwing, welding, gluing etc. Of course, other shapes of the bearing elements 40 are possible.

When a tooling board 14 is inserted in a flat bed die-cutting, stripping or blanking machine comprising a centring block 12, one of the clamps 24, 26 may be lifted due to the alignment element 30 abutting against the slanted surface 32 and upon further movement exerting a force on the slanted surface 32.

For manually lifting the clamps 24, 26, for example in order to release a tooling board 14, the centring block 12 comprises an unlocking element 42.

The unlocking element 42 is moveable in a release direction against a biasing force of the biasing means 34.

In particular, the bearing elements 40 rest on the unlocking element 42 when the clamps 24, 26 are in the aligning position such that the clamps 24, 26 are lifted when the unlocking element 42 is moved in the release direction.

The unlocking element 42 is arranged between the support blocks 22*a*, 22*b*, in particular directly above the lower support block 22*b*.

Due to the bearing elements 40 resting on the unlocking element 42, the bearing elements 40 and thus the clamps 24, 26 are lifted when the unlocking element 42 is lifted.

In the shown embodiment, the unlocking element 42 comprises a block 44, for example a plastic or metal block, and a plate like element 46 which is fixed to the block 44. In particular, the plate like element 46 is attached to a side surface of the block 44 which is faced towards the sheet metal part 20 of the support element 18.

By means of the plate like element 46, the unlocking element 42 may be supported at the sheet metal part 20 of the support element 18.

As can be seen in FIG. 2, the plate like element 46 extends over the block 44, in particular at least at opposing side surfaces of the block 44.

In an overhang of the plate like element 46 extending sidewards from the block 44, guide cut-outs 48 are provided, which extend in the release direction.

The guide cut-outs 48 allow to moveably mount the unlocking element 42 at the support element 18. In particular, the unlocking element 42 is for example mounted to the support element 18 by means of screws. However, the screws are not completely tightened to allow a movement of the unlocking element 42. For fixing the unlocking element 42 more securely, a washer may be provided.

Like the support blocks 22, the unlocking element 42, in particular the block 44, comprises bores in which the shafts 36 are received and slidably guided.

For easy operation of the unlocking element 42, the centring block 12 comprises one or two handle(s) 50 which is/are in operative connection with the unlocking element 42 such that the unlocking element 42 is moved in the release direction when the handle(s) 50 is/are actuated. The handle (s) 50 may be actuated from outside of the machine when the centring block 12 is mounted in a flat bed die-cutting, stripping or blanking machine. In FIG. 2, two handles 50 are extending in opposite directions from support block 22*a* allowing to actuate unlocking element 42 from opposite sides of the blanking machine.

Each handle 50 is guided within and extends through a hole of a bearing element 51 attached to support element 18.

In particular, the handle 50 and the unlocking element 42 are connected such that a movement of the handle 50 in a direction parallel to a main extension plane of the tooling board 14 results in a movement of the unlocking element 42 perpendicular to the main extension plane of the tooling board 14.

To establish an operative connection between the unlocking element 42 and the handle 50, the handle 50 comprises a guiding slot 52 which extends inclined to a movement direction of the unlocking element 42 and the unlocking element 42 comprises a pin 54 which runs in the guiding slot 52 such that upon actuation of the handle 50 the unlocking element 42 is forced to move in the release direction. In an alternative embodiment, the unlocking element 42 may comprise the guiding slot 52 and the handle 50 may comprise the pin 54.

The handle 50 may be made from one piece, for example as a sheet metal part, or, as shown in the Figures, from several parts.

The guiding slot 52 and the pin 54 can be seen more clearly in FIG. 3, which shows a sectional view of the centring block 12. In the depicted embodiment, the pin 54 is a screw.

FIG. 3 also shows the fastening of the clamps 24, 26 to the shafts 36. In particular, the shafts 36 are received in a respective bore 56 in the clamps 24, 26 and fixed by a headless screw.

In a side view, the clamps 24, 26 have an L-shape, wherein the bores 56 are placed in a leg of the L which extends parallel to a main extension plane of the tooling board 14.

Optionally, sliding bushes may be inserted in the bores 38 of the support blocks 22 and also in bores of the unlocking element 42.

In the following, the operation of the centring assembly 10 is described with reference to FIGS. 4 to 7.

FIG. 4 shows an insertion of a tooling board 14. In particular, FIG. 4 shows a condition of the centring assembly 10 when the alignment element 30 has just abutted the slanted surface 32 of the clamp 24 and is now moved into the reception space 28.

As soon as the alignment element 30 abuts the stop portion 31 of the clamp 26, the tooling board 14 is in its centre position. The clamp 24 may now move back into the alignment position due to the biasing force of the biasing means 34.

FIG. 5 shows the assembly of FIG. 1 during insertion of the tooling board 14 in a direction opposite to the direction shown in FIG. 4. However, the mechanism of the centring block 12 is the same, only that instead of the clamp 24 the clamp 26 is lifted by the alignment element 30.

FIG. 6 shows a side view of the centring assembly 10 with the tooling board 14 being in the centre position. In this condition, the tooling board 14 is fixed in its position due to the clamps 24, 26 encompassing the alignment element 30 respectively due to the alignment element 30 being received in the reception space 28.

FIG. 7 shows how the tooling board 14 may be released from the centring block 12 in order to remove the tooling board 14 from the flat bed die-cutting, stripping or blanking machine.

In particular, in the condition visualized in FIG. 7 the handle 50 is actuated, for example by pulling the handle 50, and the unlocking element 42 is lifted. Thus, the alignment element 30 is released from the reception space 28 and the tooling board 14 can be removed.

The invention claimed is:

1. A centering block for centering a tooling board in a flat bed die-cutting, stripping, or blanking machine, the tooling board having a protruding alignment element, the centering block comprising:

a first clamp and a second clamp which are arranged adjacent to each other to define a reception space between the first clamp and the second clamp, and which are configured to be mounted linearly movable and separately movable from each other in a direction perpendicular to a main extension plane of the tooling board, and at least one biasing means which is configured to bias the first clamp and the second clamp towards an aligning position against the tooling board, wherein each of the first clamp and the second clamp comprises a stop portion configured to restrict a movement of the tooling board in an insertion direction and an opposite direction to the insertion direction and to fix the tooling board in a center position, wherein the first clamp and the second clamp are fastened to a first slidably moveable shaft and a second slidably movable shaft, respectively, wherein each of the first slidably moveable shaft and the second slidably movable shaft include a bearing element, wherein each bearing element provides a contact surface for the biasing means, wherein the centering block comprises an unlocking element which is moveable in a release direction against a biasing force of the biasing means, and wherein each bearing element rests on the unlocking element when the first clamp and the second clamp are in the aligning position such that the first clamp and the second clamp are lifted when the unlocking element is moved in the release direction.

2. The centering block according to claim 1, wherein at least one of the first clamp and the second clamp comprises a slanted surface facing away from the reception space and in the opposite direction to the insertion direction, wherein at least one of the first clamp and the second clamp is moved against a biasing force of the biasing means when a force is applied on the slanted surface to lift the at least one of the first clamp and the second clamp.

3. The centering block according to claim 1, wherein each of the first clamp and the second clamp has an indentation, and wherein the indentations of the first clamp and the second clamp together are configured to form the reception space for the alignment element of the tooling board.

4. The centering block according to claim 1, wherein the centering block comprises a handle which is in operative connection with the unlocking element such that the unlocking element is moved in the release direction when the handle is actuated.

5. The centering block according to claim 4, wherein the handle and the unlocking element are connected and configured such that a movement of the handle in a direction parallel to a main extension plane of the tooling board results in a movement of the unlocking element perpendicular to the main extension plane of the tooling board.

6. The centering block according to claim 4, wherein one of the unlocking element or the handle comprises a guiding slot which extends inclined to a movement direction of the unlocking element, and the other one of the unlocking element or the handle comprises a pin which runs in the guiding slot such that, upon actuation of the handle, the unlocking element is forced to move in the release direction.

7. The centering block according to claim 1, the centering block further comprising a support element for fixing the centering block to an elongated rail of the flat bed die-cutting, stripping, or blanking machine.

8. A centering assembly for a flat bed die-cutting, stripping, or blanking machine, the centering assembly comprising:

the centering block according to claim 1, the tooling board comprising the alignment element, wherein the centering block is configured to center the tooling board by centering the alignment element, and at least one elongated rail for slidably guiding the tooling board into and out of the flat bed die-cutting, stripping, or blanking machine.

9. A centering block comprising:

a first clamp and a second clamp which are arranged adjacent to each other creating a reception space for receiving an alignment element, wherein the first clamp and the second clamp are configured to be mounted linearly movable in a first direction and separately movable from each other in a second direction perpendicular to the first direction, and at least one biasing means which is configured to bias the first clamp and the second clamp towards an aligning position against the alignment element, wherein each of the first clamp and the second clamp comprises a stop portion configured to restrict a movement of the alignment element in an insertion direction and an opposite direction to the insertion direction and to fix the alignment element in a center position, wherein the first clamp and the second clamp are fastened to a first slidably moveable shaft and a second slidably movable shaft, respectively, wherein each of the first slidably moveable shaft and the second slidably movable shaft include a bearing element, wherein each bearing element provides a contact surface for the biasing means, wherein the centering block further comprises an unlocking element which is moveable in a release direction against a biasing force of the biasing means, and wherein each bearing element rests on the unlocking element when the first clamp and the second clamp are in the aligning position such that the first clamp and the second clamp are lifted when the unlocking element is moved in the release direction, wherein the centering block further comprises a handle which is in operative connection with the unlocking element such that the unlocking element is moved in the release direction when the handle is actuated, and wherein the handle and the unlocking element are connected and configured such that a movement of the handle in the first direction results in a movement of the unlocking element in the second direction.

10. The centering block according to claim 9, wherein at least one of the first clamp and the second clamp comprises a slanted surface facing away from the reception space and in the opposite direction to the insertion direction, wherein at least one of the first clamp and the second clamp is moved against a biasing force of the biasing means when a force is applied on the slanted surface to lift the at least one of the first clamp and the second clamp.

11. A centering block comprising:

a first clamp and a second clamp which are arranged adjacent to each other creating a reception space for receiving an alignment element, wherein the first clamp and the second clamp are configured to be mounted linearly movable in a first direction and separately movable from each other in a second direction perpendicular to the first direction, and at least one biasing means which is configured to bias the first clamp and the second clamp towards an aligning position against the alignment element, wherein each of the first clamp and the second clamp comprises a stop portion configured to restrict a movement of the alignment element in an insertion direction and an opposite direction to the insertion direction and to fix the alignment element in a center position, wherein the first clamp and the second clamp are fastened to a first slidably moveable shaft and a second slidably movable shaft, respectively, wherein each of the first slidably moveable shaft and the second slidably movable shaft include a bearing element, wherein each bearing element provides a contact surface for the biasing means, wherein the centering block further comprises an unlocking element which is moveable in a release direction against a biasing force of the biasing means, and wherein each bearing element rests on the unlocking element when the first clamp and the second clamp are in the aligning position such that the first clamp and the second clamp are lifted when the unlocking element is moved in the release direction, wherein the centering block further comprises a handle which is in operative connection with the unlocking element such that the unlocking element is moved in the release direction when the handle is actuated, and wherein one of the unlocking element or the handle comprises a guiding slot which extends inclined to the first direction of the unlocking element, and the other one of the unlocking element or the handle comprises a pin which runs in the guiding slot such that, upon actuation of the handle, the unlocking element is forced to move in the release direction.

12. The centering block according to claim 9, the centering block further comprising a support element for fixing the centering block to an elongated rail of a flat bed die-cutting, a stripping machine, or a blanking machine.

* * * * *